United States Patent
Roy

(10) Patent No.: US 6,789,411 B2
(45) Date of Patent: Sep. 14, 2004

(54) DETECTING LEAKS IN PIPES

(75) Inventor: Keith John Roy, Newport (GB)

(73) Assignee: Palmer Environmental Limited, Cwmbran (GB)

( * ) Notice: Subject to any disclaimer, the term of this patent is extended or adjusted under 35 U.S.C. 154(b) by 0 days.

(21) Appl. No.: 10/197,166

(22) Filed: Jul. 17, 2002

(65) Prior Publication Data

US 2003/0033877 A1 Feb. 20, 2003

Related U.S. Application Data

(62) Division of application No. 09/259,088, filed on Feb. 26, 1999, now Pat. No. 6,647,762.

(30) Foreign Application Priority Data

Mar. 5, 1998 (GB) .............................................. 9804541

(51) Int. Cl.⁷ ................................................ G01M 3/28
(52) U.S. Cl. ...................... 73/40.5 A; 73/49.1; 340/605
(58) Field of Search ............................. 73/40.5 A, 49.1; 340/605

(56) References Cited

U.S. PATENT DOCUMENTS

| 4,066,095 A | * | 1/1978 | Massa ...................... 73/40.5 A |
| 4,858,462 A | * | 8/1989 | Coulter et al. ............ 73/40.5 A |
| 4,958,296 A | * | 9/1990 | Saitoh et al. ............. 73/40.5 A |

FOREIGN PATENT DOCUMENTS

DE  3911648  * 9/1991  ............... 73/40.5 A

OTHER PUBLICATIONS

Reten Electronic , Equipment, systems and EDP for monitoring and analysis of pipe systems: Localisation of leakages; Loss and consumption analysis; Duct seeking, 1993 Catalogue.*

* cited by examiner

Primary Examiner—Daniel S. Larkin
(74) Attorney, Agent, or Firm—Vedder Price Kaufman & Kammholz, P.C.

(57) ABSTRACT

An apparatus for permanently or semi-permanently fitting to an underground water pipe 15,16 for detecting leaks therein, comprises a hydrophone 26 mounted to acoustically monitor water flowing along the pipe 15,16 and means 29 for analyzing a parameter of the output signal of the hydrophone 26 and for generating an alarm signal, in the event that the parameter is above a maximum value or below a minimum value. The apparatus further comprises a radio transmitter for transmitting the alarm signal to a remote receiver, so as to indicate the detection of a leak. The maximum and minimum values are preferably calculated using historical data obtained from the hydrophone 26, so that the values are automatically adjusted to suit location of the apparatus. In use, a plurality of leak detection apparatus can be installed to pipes at various locations around a geographical area of supply. Once a leak has been identified in an area, it is then a relatively simple matter to more precisely determine where in the area should be surveyed using a conventional leak detector. Thus, the need to survey the whole of the area using a conventional leak detector is avoided.

21 Claims, 1 Drawing Sheet

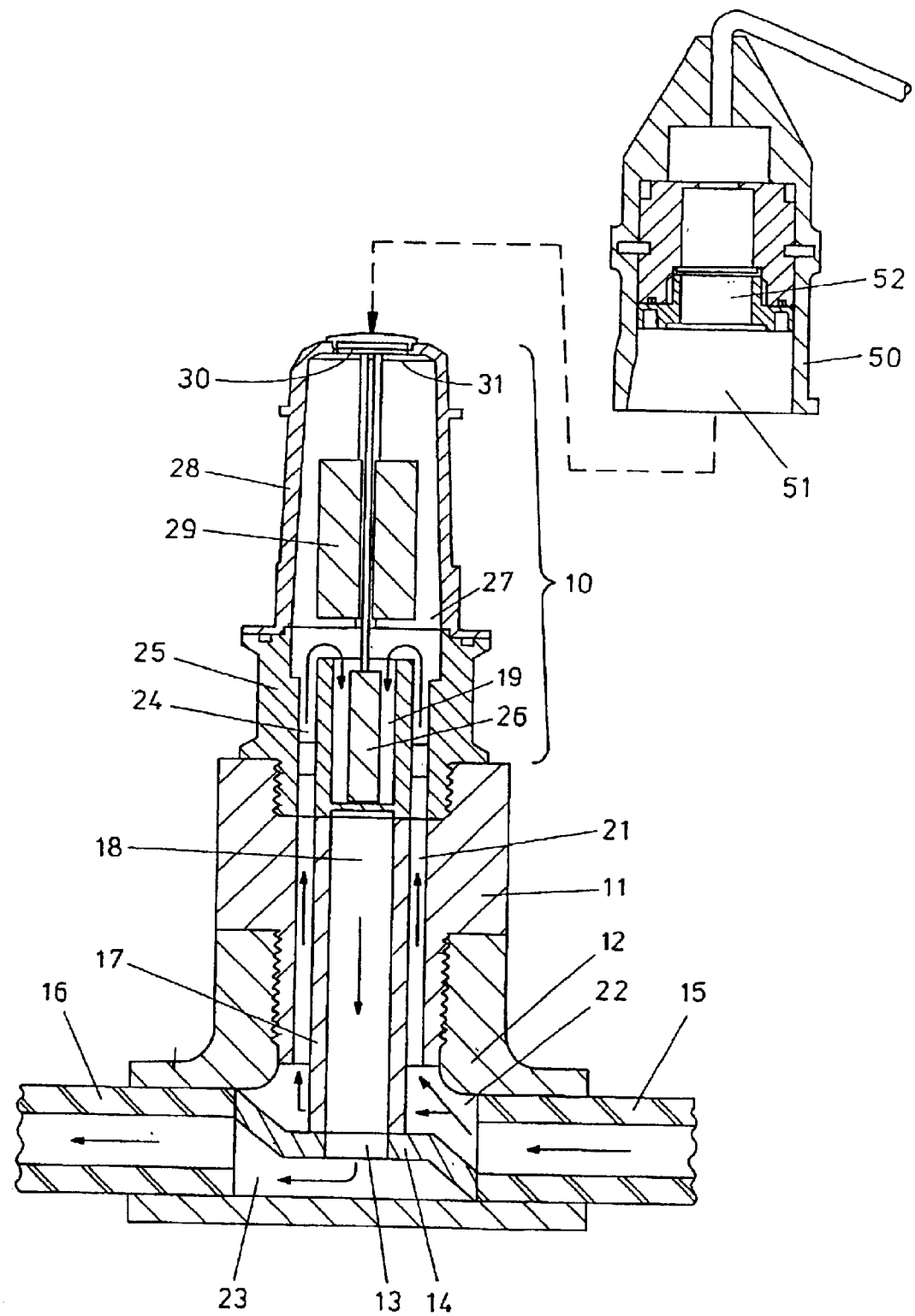

DETECTING LEAKS IN PIPES

This is a continuation of prior application Ser. No. 09/259,088, filed Feb. 26, 1999, now U.S. Pat. No. 6,647,762, which is hereby incorporated herein by reference in its entirety.

BACKGROUND OF THE INVENTION

This invention relates to detecting leaks in pipes which carry fluids such as water.

It is known to locate leaks in underground water pipes using so-called leak detectors, which can pinpoint leaks prior to excavating the ground.

Before using a leak detector it is normal to identify the general geographic area which is experiencing water loss. Typically, the presence of a leak is initially identified by taking readings from meters located at various water distribution points, in order to see whether there is increased consumption, especially at night.

Suspected leaks can then be located using a leak detector. However, a disadvantage of this arrangement is that it is time consuming to subsequently survey the whole of the geographical area, in which there is a suspected fluid loss, using leak localisers.

We have now devised an apparatus for detecting leaks in pipes which alleviates the above-mentioned problem.

SUMMARY OF THE INVENTION

In accordance with this invention, there is provided an apparatus for detecting leaks in pipes comprising a transducer for acoustically monitoring the pipe, means for analysing a parameter of the output signal of the transducer and for generating an alarm signal, in the event that the parameter is above a maximum value or below a minimum value and means for outputting said alarm signal.

In use, a plurality of apparatus in accordance with this invention can be temporarily or permanently installed to pipes at various locations around a geographical area of supply. Thus, once a leak has been identified in an area, it is a relatively simple matter to more precisely determine where in the area should be surveyed, by monitoring at the remote receiver for an alarm signal. Accordingly, it will be appreciated that the need to survey the whole of the area is avoided.

In one embodiment, the alarm signal output means comprises a transmitter, such as a radio transmitter, which transmits a wireless alarm signal to a remote receiver.

The remote receiver may comprise means for logging the position where the alarm signal is received. Thus, for example, receivers may be mounted on delivery vehicles, which frequently drive around areas. Data is then downloaded from the receivers on a regular basis, with the precise location of any detected alarm signals being recorded. Preferably, the position logging means receives signals from a global position satellite.

In a second embodiment, the alarm signal output means may be arranged to transmit the alarm signal along a cable to the remote receiver. In a third embodiment, the alarm signal output means comprises an optical or audible transducer.

Preferably, the transmitting means transmits a low power radio signal, thereby conserving the battery power of the apparatus and enabling a plurality of apparatus to transmit on the same frequency, without the risk of interference.

In use, an alarm signal can be detected by moving or by driving around the geographical area with a remote receiver unit, until an alarm signal is detected; the point of the leak can then be pinpointed using a conventional leak detector.

Preferably, the transmitter is arranged to transmit a different standby signal when said parameter is not above said maximum value or below said minimum value. Thus, it will be apparent that the apparatus may not be working correctly, when neither the standby signal nor the alarm signal is detected at the remote receiver.

Preferably, the transmitter only transmits a signal periodically, in order to further conserve battery power.

Preferably, the alarm signal is transmitted more frequently than the standby signal, so that the alarm signal is less likely to be overlooked whilst moving or driving around the area.

The most common way of localising leaks is achieved using the correlation principle, in which two acoustic transducers are mounted at different points on the pipe under analysis. A correlator then compares the noise detected at the two sensor points and determines the difference between the time which the noise takes to reach one sensor compared with the time which it takes to reach the other sensor. Thus, the leak position can be determined from the following formula:

$$L = \frac{D - (V \times T_d)}{2}$$

where:

L=leak position

D=distance between the sensors

V=velocity of sound for pipe under consideration $T_d$=time delay between noise signals.

It is difficult and time consuming to attach the acoustic transducers of a leak localiser to the pipe each time a measurement is taken and it will be appreciated that it is sometimes necessary to reposition the transducers and take several new measurements before the leak can be pinpointed.

Thus, preferably, the apparatus comprises a port for providing an external connection to its acoustic transducer. In use, once an alarm signal has been detected by one of the apparatus, the leak can be pinpointed by connecting a correlator to the respective ports of two leak detection apparatus in accordance with this invention. The correlator then uses the acoustic transducers of the two apparatus to take its measurements and accordingly measurements can be taken far more easily and quickly, since no time needs to be spent connecting separate acoustic transducers to the pipe.

Preferably, the port comprises a transmitter which provides a wireless link to a corresponding port of the leak localiser. In this manner, the apparatus can be provided with a completely sealed body, so that the ingress of fluid can be prevented.

Leaks in pipes generate a noise and this noise can be detected when there is a leak. However, a problem of detecting leaks in this manner is that the noise created by normal fluid consumption can mask the noise created by the leak. Thus, preferably, the apparatus comprises a clock, the analysing means being arranged to analyse the parameter of the output signal of the transducer at night, when little or no fluid consumption normally occurs.

All pipes have different noise characteristics from each other. Hence, the noise level indicating a leak will vary greatly throughout the geographical area. This problem is further exacerbated by the fact that plastics pipes do not conduct sound as well as metal pipes.

Accordingly, it will be appreciated that it is not possible to reliably detect for a leak at different locations by merely comparing the value of the parameter of the output of the transducer at each location with the same maximum and/or minimum value.

In order to overcome this problem, the analysing means is preferably arranged to periodically measure the output level of the transducer and to provide an average of previously measured levels, the monitoring means being further arranged to determine said maximum and/or minimum values from said average. In this manner, the level at which the alarm signal is triggered at each location is dependent upon the average of previous noise values at that location.

Preferably, an alarm signal is also generated, in the event that the parameter is above an absolute maximum value or below an absolute minimum value.

A disadvantage of using average values to determine the maximum or minimum values is that the readings used in the average calculation could include readings which are representative of a leak and this could mean that some leaks go undetected. In order to prevent this, the monitoring means is preferably arranged to reject readings from the average calculation which are above a maximum threshold value or below a minimum threshold value.

The maximum and/or minimum threshold values should themselves vary between locations, in order to take account of the different surroundings. Accordingly, the monitoring means is preferably arranged to reject readings from the average calculation which are a predetermined amount more or less than the median of the stored readings.

In order to prevent intermittent noise from triggering an alarm, the monitoring means is preferably arranged to only produce an alarm signal if a reading which is above said maximum limit or below said minimum limit is not substantially different from an adjacent reading.

Preferably, the monitoring means is arranged to take a series of measurements of the output level of the transducer, the monitoring means being arranged to compare the level that has been exceeded for a predetermined percentage number of readings with said maximum or minimum values and/or to compare the spread between levels which have exceeded predetermined upper and lower percentage numbers of readings.

Known acoustic transducers can be mounted inside a body which is screwed to a fitting in the pipe. However, a disadvantage of this arrangement is that air needs to bled out of the body, so that the acoustic transducer is fully in contact with the fluid in the pipe.

Air is carried along with fluid flowing along pipes and this air can collect in closed cavities in the pipe. Accordingly, a leak detection apparatus in accordance with this invention may cease to operate correctly, unless the cavity in which its transducer is mounted is regularly bled of air.

In one embodiment, an air bleed valve is mounted in a flow passage through a body of the apparatus, sensing means being provided for opening said valve, when a build up of air is sensed in the flow passage.

Alternatively, in accordance with this invention, as seen from a second aspect, there is provided an assembly comprising a transducer for acoustically monitoring fluid flowing along a pipe, the assembly comprising a body having a port for connecting to a corresponding port in the wall of the pipe, a fluid-flow passage extending through the body and having opposite ends communicating with the port, an acoustic transducer mounted inside the flow passage, and flow diverting means for diverting at least some of the fluid flowing along the pipe through said flow passage.

In use, the assembly is attached as a spur to a conventional port in the pipe, with at least some of the fluid in the pipe being branched off through the passageway. Thus, the body is continually flushed by the fluid and hence air cannot build up around the transducer. Furthermore, the fluid flushes out any air which is present in the body when the apparatus is first installed.

Preferably, the flow diverting means is arranged to divert all of the fluid flowing along the pipe under analysis through the passageway.

These and other objects, features, and advantages of the present invention will be clearly understood through consideration of the following detailed description.

BRIEF DESCRIPTION OF THE DRAWING

An embodiment of this invention will now be described by way of example only and with reference to the accompanying drawing, the single FIGURE of which is a sectional view through a leak detection apparatus, in accordance with this invention, when connected to a water pipe.

DETAILED DESCRIPTION OF THE PREFERRED EMBODIMENTS

Referring to the drawing, there is shown an embodiment of a leak detection apparatus 10 connected via an adaptor 11 to the body of a conventional stopcock 12 of the kind that is commonly found in underground pits outside most dwellings. However, it will be appreciated that the apparatus could be connected to any convenient point that allows access to the water in the pipe.

Normally, the stopcock 12 comprises a valve member which can be closed to prevent the flow of water through an aperture 13 in a partition wall 14 that is disposed between inlet and outlet pipes 15, 16 connected to respective ports of the stopcock. However, in order to fit the leak detector 10, the valve member is unscrewed from the body of the stopcock 12 and the adaptor 11 fitted in its place. A base 25 of the leak detector 10 is then screwed to the upper end of the adaptor 11, as shown in the drawing.

The adaptor 11 comprises a tubular extension 17 which seals around the aperture 13 in the partition wall 14. The tubular extension comprises a through passage 18 which extends through the adaptor 11 and communicates with a corresponding tubular central passage 19 formed in the base 25 of the leak detector 10. A valve member (not shown) may be provided for closing the through passage 18, so that the stopcock feature is still provided.

An annular-section passage 21 extends concentrically with the central passage 18 through the adapter 11. The lower end of the passage 21 communicates with a chamber 22 formed above the partition wall 14 of the stopcock 12.

The chamber 22 above the partition wall 14 communicates with the inlet pipe 15 and a corresponding chamber 23 below the partition wall 14 communicates with the outlet pipe 16.

The upper end of the annular-section passage 21 through the adaptor 11 communicates with a corresponding annular-section passage 24 in the base 25 of the leak detector 10.

An elongate hydrophone 26 is disposed axially within the central passage 19 in the base 25 of the leak detector 10. The hydrophone 26 is supported by radially-extending webs (not shown). The upper end of the central passage 19 in the base 25 of the leak detector 10 communicates with the upper end of the outer annular-section passage 24, adjacent a bottom wall 27 of a hollow tubular body 28 of the detector.

Wires extend from the hydrophone 26 to a printed circuit board 29 sealingly mounted within the body 28 of the leak detector 10. A window 30 is provided on the upper end of the body 28 of the leak detector 10 and below this is an infra-red transmitter/receiver 31, which is connected via wires to the printed circuit board 29. A battery (not shown) is also mounted inside the body 28 of the leak detector 10.

In use, once the leak detector and adaptor 11 have been fitted to the stopcock 12, as hereinbefore described, water can be applied to the inlet pipe 15. The water flows from the inlet pipe 15 into the upper chamber 22 of the stopcock 12 and upwardly through the outer annular-section passage 21,24 in the adaptor 11 and leak detector 10 respectively. The water flow then turns radially inwardly and downwardly through the central passage 19,18 in the leak detector 10 and adaptor respectively, thereby passing the hydrophone 26. Finally, the water flows into the lower chamber 23 of the stopcock 12 and out into the outlet pipe 16.

It will be appreciated that the entire water flow is branched off by the adaptor 11 through the leak detector 10 and past the hydrophone 26, which is mounted axially within the passage 19. Accordingly, in use no air will be able to collect around the hydrophone 26 to impede the performance of the leak detector 10. Furthermore, any air which is present in the leak detector when it is initially fitted will be washed away by the water flow.

Thus, it will be appreciated that the need to bleed the detector of air is avoided, thereby providing the advantage that the detectors require no further maintenance once they have been installed.

When there is a leak in the pipe, a noise is created as the water flows through the leak. During the daytime it is difficult to detect the noise created by a leak, owing to the amount of noise created by normal water consumption. However, the detector 10 is arranged to acoustically monitor the pipe at night, when consumption is normally at a minimum.

At night the increased noise level of a leak can be detected to trigger an alarm. Also, when there is a leak the sound level that is detected tends to remain substantially level, whereas under no leak the noise level fluctuates greatly.

Thus, the detector 10 is arranged to periodically take noise samples over a predetermined time period, each day during night time hours. A distribution histogram of noise level against the percentage number of readings at those levels is then constructed from the recorded data. The results are characterised by level and spread parameters, where:

Level=$L_{n1}$

Spread=$L_{n2}-L_{n3}$

The values $L_{nx}$ represent the noise levels that have been exceeded for n % of the time.

Initially, on the first day of installation, a leak is detected by comparing the two parameters of the readings against respective absolute values X and Y, which are preprogrammed into the detector 10. As stated above, these parameters are the noise level which has been exceeded for n % of the time and the spread between the noise level which has been exceeded between n2 and n3% of the measurement time.

Thus, a leak is indicated if:

| | |
|---|---|
| | Level ($L_{n1}$) > XdB |
| or | Spread ($L_{n2}-L_{n3}$) < YdB |

Over the next six days, a leak is detected by comparing the two parameters against the absolute values X and Y, as well as to the two parameters of the readings taken on the first day. In the latter case, a leak is indicated if the present day's parameter is more than a predetermined amount different from the corresponding reading on the first day.

After seven days, standard reference values, against which the two parameters can be compared, are calculated, assuming that no leak has been detected. Initially, the median of the seven days of no leak results is found for both parameters and the other six values are then compared with the median.

If the magnitude of the difference between any of the six values and the median is more than a predetermined amount, then that value is rejected from the reference calculation.

Thus, for example the second level value is rejected if:

$|2^{nd}$ Level−median level$|>GdB$

Or the second spread value is rejected if:

$|2^{nd}$ Spread−median spread$|>HdB$

Standard reference values for the two parameters are then formed from the average of the values which are not rejected from the reference calculations.

Each following day, subsequent daily values for level and spread are compared with the absolute values X and Y as well as with the standard reference values that have been derived.

Thus, a leak is indicated if:

| | |
|---|---|
| | new Level > XdB |
| or | new Spread < YdB |
| or | new Level − Standard level value > QdB |
| or | reference spread value − new spread > RdB |

Leaks can be reliably and confidently detected at each apparatus location, because the readings at each location are compared with absolute values, as well as with reference values that are calculated using no leak readings, which are taken at that location during the first days after installation.

It is possible for noise created by intermittent system use at night to mimic leakage. Thus, once a leak has been detected, the apparatus takes another set of readings on the same day and determines where these also indicate a leak. Accordingly, an alarm condition is only triggered when two or more consecutive sets of readings indicate a leak. Obviously, this number can be increased in areas which are prone to intermittent water usage at night.

When an alarm condition is triggered, a low power radio transmitter housed inside the body 28 of the apparatus is energised to periodically transmit an alarm signal. Under no leak conditions the transmitter may transmit a periodic standby signal, in order to provide an indication that the apparatus is functioning correctly. The mark-to-space ratio of the standby signal is preferably larger than the mark-to-space ratio of the alarm signal, in order to conserve battery power.

It is envisaged that a plurality of leak detection apparatus in accordance with this invention will be installed at various locations around a geographical area. Thus, when a leak is detected in the area, it is a relatively simple matter to drive around the area with a radio receiver, until an alarm signal is detected. It will then be apparent that the leak is adjacent to the point of installation of the apparatus which is transmitting the signal.

The leak can then be pinpointed quickly and easily using a leak detector having two remote data acquisition units that are interconnected by a wire or by a wireless communication link.

Each unit comprises an optical coupler 50, as shown in the drawings. In use, the couplers 50 of the two data logging units are connected to respective leak detection apparatus of the present invention, which are located on either side of the suspected leak. The upper end of the body 28 of each apparatus extends into a correspondingly-shaped socket 51 in the coupler 50. An infra-red transmitter/receiver 52 located at the upper end of the socket 51 in the coupler 50 communicates with the transmitter/receiver 31 in the leak detection apparatus 10, thereby enabling the two logging units to communicate directly with the hydrophones 26 in the respective apparatus with which they are connected.

The noise generated by the leak is detected by each hydrophone 26, however, the time taken for the noise to reach the two hydrophones is different; the precise location of the leak can accordingly be determined as a function of time difference.

While the preferred embodiment of the invention has been shown and described, it will be apparent to those skilled in the art that changes and modifications may be made therein without departing from the spirit of the invention, the scope of which is defined by the appended claims.

I claim:

1. An apparatus for detecting a leak in a pipe for installation at a location on a pipe, the apparatus comprising:
   a transducer for acoustically monitoring the pipe;
   analyzing means for analyzing a parameter of an output signal of the transducer and for determining if a signal indicative of a leak should be outputted; and
   a transmitter configured to transmit a wireless signal indicative of a leak to a remote receiver which is mobile with respect to the pipe.

2. The apparatus as claimed in claim 1, in which the transmitter transmits a low power radio signal.

3. The apparatus of claim 1, further comprising means to identify the said location.

4. The apparatus of claim 3, in which the remote receiver includes means to log the position of the receiver when it received the signal indicative of a leak.

5. The apparatus of claim 1, in which said transmitter transmits a periodic signal indicative of a leak.

6. The apparatus of claim 1, further including a clock and said analyzing means being arranged to analyze the parameter of the output signal of said transducer during night hours.

7. The apparatus of claim 1, in which said transmitter outputs a standby signal when said parameter is not above a maximum value or below a minimum value.

8. The apparatus of claim 7, in which said signal indicative of a leak is a signal having a periodic form and said standby signal also has a periodic form with a larger period than that of said signal indicating a leak.

9. The apparatus of claim 1, wherein the analyzing means is configured to determine that a signal indicative of a leak should be outputted in the event the parameter is above a maximum value or below a minimum value.

10. The apparatus of claim 9, in which said analyzing means is arranged to periodically measure the output level of said transducer and to provide an average of previously measured levels and being further arranged to determine said maximum and/or minimum values from said average.

11. The apparatus of claim 10, in which the signal indicative of a leak is also generated, in the event that said parameter is above an absolute maximum value or below an absolute minimum value.

12. The apparatus of claim 10, in which said analyzing means is arranged to reject readings from said average calculation, which are above a maximum threshold value or below a minimum threshold value.

13. The apparatus of claim 10, in which said analyzing means is a arranged to reject readings from the average calculation, which are a predetermined amount more or less than the median of the previously measured levels.

14. The apparatus of claim 10, in which said analyzing means is arranged to only produce an alarm signal if a reading which is above said maximum value or below said minimum value is not substantially different from an adjacent reading.

15. The apparatus of claim 1, in which the analyzing means is arranged to take a series of readings of the output level of the output signal and the signal indicative of a leak is generated if the output level exceeds a predetermined maximum or if the spread between levels is less than said a minimum value.

16. An apparatus for detecting a leak in a pipe for installation at a location on a pipe, the apparatus comprising:
   a transducer for acoustically monitoring the pipe;
   a port for providing an in-situ external connection to the transducer;
   analyzing means for analyzing a parameter of an output signal of the transducer and for determining if a signal indicative of a leak should be outputted; and
   output means configured to output a signal indicative of a leak, wherein the analyzing means determines that a signal indicative of a leak should be outputted in the event that the parameter is above a maximum value or below a minimum value.

17. The apparatus of claim 16, in which the port includes a transmitter which provides a wireless link to a corresponding port of a leak pinpointer.

18. The apparatus of claim 17, wherein the wireless link is provided by an infra-red transmitter.

19. The apparatus of claim 16, in which said signal output means comprises an optical or audible transducer.

20. A system for monitoring a pipe for a leak, the system comprising a plurality of leak detection units each being arranged to monitor a section of the pipe for leaks and to transmit a wireless signal which indicates whether or not a leak has been detected, the system further comprising a mobile receiver which is arranged to sequentially receive the wireless signals from the leak detection units as the receiver moves with respect to the units.

21. A method of monitoring a pipe for leaks, the method comprising:
   providing a plurality of leak detection units at locations on the pipe, each of the detection units being arranged to monitor a section of the pipe for leaks and to transmit a wireless signal which indicates whether or not a leak has been detected; and
   moving a mobile receiver past the units and sequentially receiving the wireless signal from the nearest unit as the mobile receiver moves into the vicinity of each unit.

* * * * *